July 27, 1948.     L. A. MAJNERI     2,445,855
FLUID PRESSURE CONTROL DEVICE
Filed Nov. 19, 1942     2 Sheets-Sheet 1
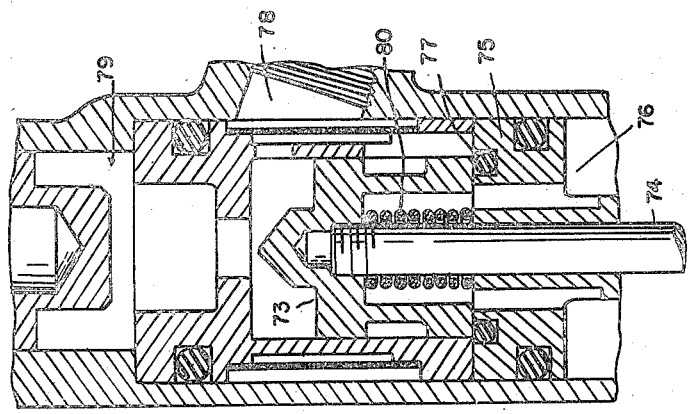
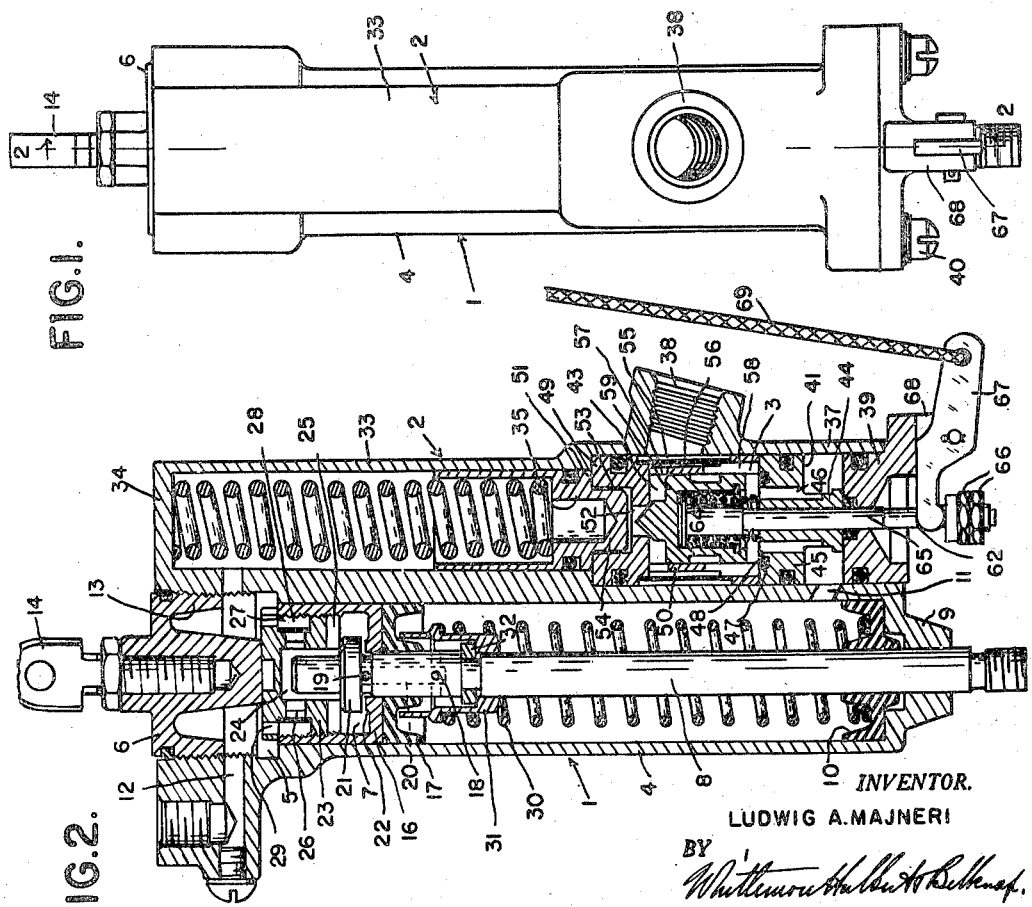
INVENTOR.
LUDWIG A. MAJNERI
BY
ATTORNEYS

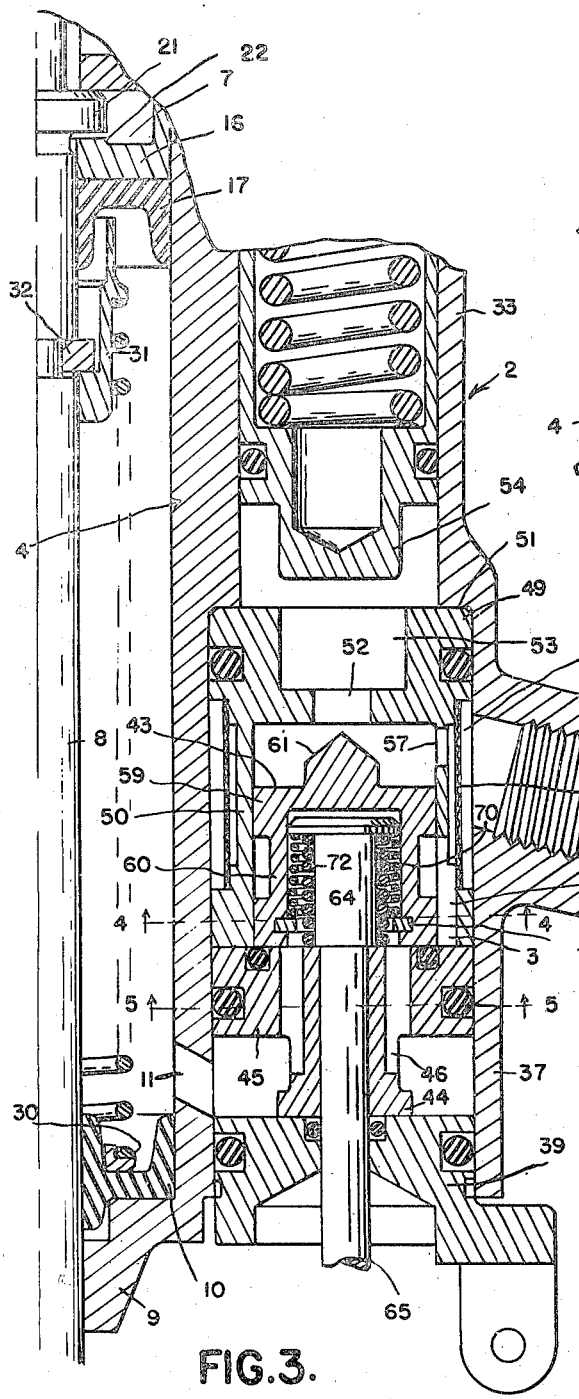

Patented July 27, 1948

2,445,855

UNITED STATES PATENT OFFICE 2,445,855

FLUID PRESSURE CONTROL DEVICE

Ludwig A. Majneri, Grosse Pointe, Mich., assignor to The Warner Aircraft Corporation, Detroit, Mich., a corporation of Michigan Application November 19, 1942, Serial No. 466,183

7 Claims. (Cl. 60—54.5)

The invention relates to fluid pressure control devices and refers more particularly to devices of the type having a main mechanism for producing fluid pressure and an auxiliary mechanism for yieldably maintaining fluid pressure.

The invention has for one of its objects to provide an improved fluid pressure control device in which the main fluid pressure producing mechanism is normally operative and the auxiliary fluid pressure producing mechanism is normally inoperative.

The invention has for another of its objects to provide the device with an improved manually operable control mechanism.

The invention has for a further object to so construct the device that it is compact.

With these and other objects in view, the invention resides in the novel features of construction and combinations and arrangements of parts as more fully hereinafter set forth.

In the drawings:

Figure 1 is an elevation of a fluid pressure control device embodying the invention;

Figure 2 is a cross section on the line 2—2 of Figure 1;

Figure 3 is an enlarged view similar to a portion of Figure 2 and showing parts in different positions during the operation of the device;

Figures 4 and 5 are cross sections on the lines 4—4 and 5—5, respectively, of Figure 3;

Figure 6 is a view similar to Figure 3 showing a modified fluid pressure control device.

The fluid pressure control device embodying the invention is designed particularly for use in a hydraulic brake system and especially in a hydraulic brake system for applying brakes of landing wheels of an airplane. The device, in general, comprises the main fluid pressure producing mechanism 1, the auxiliary fluid pressure producing mechanism 2 and the manually operable control mechanism 3.

The main fluid pressure control mechanism 1 occupies a substantially vertical position and comprises the cylinder 4, the fluid reservoir 5 above the cylinder 4, the upper end fitting 6, the piston 7 slidable in the cylinder 4, and the piston rod 8. The cylinder 4 is closed at its lower end by the cross wall 9 and the sealing cup 10 through both of which the piston rod 8 extends. The cylinder 4 is provided near its lower end with the outlet 11. The fluid reservoir 5 is of larger diameter than the cylinder 4 and is preferably provided with the inlet 12 which is connected to an auxiliary fluid reservoir. The upper end fitting 6 has the depending annular flange 13 which is preferably threaded into the upper end of the fluid reservoir 5 and the fitting has secured thereto the eye-bolt 14 for receiving a pivot pin of a suitable support.

The piston 7 has a body formed of the sleeve 15 and the head 16 at the lower end of the sleeve, the sleeve being slidable within the cylinder 4 and the head slidably engaging the piston rod 8 which extends axially therethrough. The piston 7 also has the sealing cup 17 preferably formed of rubber and abutting the lower side of the head 16 and provided with concentric lips for slidably engaging the wall of the cylinder 4 and the piston rod 8.

The piston rod 8 is formed with by-pass means for the piston 7 to place the fluid reservoir 5 in communication with the cylinder 4 below the piston. The by-pass means comprises a passage formed of the lower and upper radial bores 18 and 19, respectively, and the axial bore 20 connecting the lower and upper bores. When the parts are in their normal or off positions, the lower radial bores are below the inner lip of the sealing cup 17 and the upper radial bores are above the head 16 of the piston body. The piston rod has the enlargement 21 above the upper radial bores 19 and forming a valve having its lower face engageable with the centrally raised face 22 of the head 16 to close the by-pass means for the piston and also to move the piston downwardly or forwardly to advance the same. The valve 21 also functions to return the piston to its normal or off position and, as shown, 23 is a body threaded into the sleeve 15 of the piston and provided with the central downwardly opening recess 24 for freely receiving the upper end portion of the piston rod above the valve. The lower face of the body is formed with the radial grooves 25 which open into the recess and provide for passage of fluid between the body and the valve. The body has the radial openings 26 opening into the upper portion of the recess 24 and into the annular groove 27, there being the annular screen 28 between the radial openings and the annular groove. The head is further provided with the axially extending openings 29 for placing the annular groove in communication with the fluid reservoir. 30 is a coil spring within the cylinder 4 and encircling the piston rod 8 and having its lower end abutting the sealing cup 10 and its upper end abutting the cup-shaped retainer 31 which is sleeved on the piston rod and is held in engagement with the C-washer 32 which engages an annular groove in the piston rod. The upper end of the retainer is preferably provided with radial grooves to assure communication between the portion of the cylinder surrounding and below the retainer and the reservoir above the piston.

With the construction as thus far described, it will be seen that when the parts are in their normal or off positions, as shown in Figure 1, the fluid reservoir 5 is in communication with the cylinder 4 through the axially extending openings 29, the annular groove 27, the radial openings 26, the central recess 24, the radially extending grooves 25, the by-pass in the piston rod 8 formed by the radial bores 18 and 19 and the axial bore 20, and the slots in the upper end of the retainer 31. It will be seen that upon downward movement of the piston rod 8 through the instrumentality of a suitable foot pedal pivotally connected to the lower end of the piston rod, the valve 21 of the piston rod is moved downwardly into engagement with the face 22 of the head 16 of the piston and closes the piston by-pass means and then compels the piston to move downwardly, thereby forcing the fluid under pressure through the outlet 11.

The auxiliary fluid pressure producing mechanism 2 comprises the upper cylinder 33 which is parallel to and integral with the cylinder 4 and has its upper end closed by the transverse wall 34 which is substantially flush with the upper end of the reservoir 5. The auxiliary fluid pressure producing mechanism also comprises the piston 35 slidable in the cylinder 33 and the coil spring 36 which abuts the wall 34 and the head of the piston 35.

To control the operation of the fluid pressure control device and, more particularly, the operation of the main and auxiliary fluid pressure producing mechanisms 1 and 2, respectively, the fluid pressure control device is provided with a passage for fluid with which is associated the manually operable control mechanism 3. More in detail, the fluid pressure control device is provided with the lower cylinder 37 which is below and in axial alignment with the upper cylinder 33 and integral with both the cylinders 4 and 33. The lower cylinder 37 is of larger diameter than the upper cylinder 33 and is provided near its upper end with the outlet 38 which is adapted to be connected to the wheel cylinders of the airplane landing wheel brakes by suitable tubing. The lower end of the lower cylinder 37 is closed by the plug 39 which extends within the lower end of the cylinder and is suitably secured in place as by means of the screws 40. The upper face of the plug terminates below the outlet 11. 41 and 42 are bodies clamped within the lower cylinder 37 by the plug 39 and cooperating to form a chamber within which the valve 43 is slidable. The body 41 has the stem 44 and the head 45 and is provided with the axially extending openings 46 located partially in the stem and partially in the head. The stem abuts the upper face of the plug 39 and the head is provided with the concentric annular groove 47 encurcling the axial openings 46 and receiving the sealing ring 48. The body 42 is a hollow body having the head 49 and the annular flange 50. The upper face of the head 49 abuts the annular shoulder 51 formed at the upper end of the lower cylinder 37 and the lower face of the annular flange 50 abuts the upper face of the head 45 of the body 41 and also the sealing ring 48, thereby holding the latter in place. The head 49 is provided with the axial opening 52 therethrough for placing the chamber formed by the bodies 41 and 42 in communication with the auxiliary fluid pressure producing mechanism 2. As shown, the head 49 is provided in its upper portion with the central recess 53 communicating with the axial opening 52 and adapted to receive the depending projection 54 which is formed upon the head of the piston 35 of the auxiliary fluid pressure producing mechanism. The annular flange 50 is provided with the external annular groove 55 registering with the outlet 38 and containing the annular screen 56. The annular flange is also provided near its upper end with the radially extending openings 57 and at its lower end with the longitudinally extending openings 58 which lead from the lower end of the annular flange to the annular groove 55. It will be noted that the plug 39 and the heads 45 and 49 of the bodies 41 and 42, respectively, are provided with annular grooves for receiving sealing rings to prevent the escape of fluid along the wall of the lower cylinder 37.

The valve 43 is hollow, having the head 59 and the annular flange 60. The head is provided with the upwardly extending conical projection 61 for seating on the lower annular corner bounding the axial opening 52. The lower face of the annular flange 60 is adapted to seat at its radially outer edge upon the sealing ring 48. 62 is a rod for actuating the valve 43. The rod has the head 63 located in the upper end portion of the recess formed by the annular flange 60 and has the enlarged stem portion 64 leading from the head and adapted to abut the head 45 of the body 41. The rod also has the reduced stem portion 65 depending from the stem portion 64 through the stem 44 and the plug 39 and threadedly engaged at its lower end by the nuts 66. 67 is a lever embracing the reduced stem portion 65 and abutting the upper nut 66. The lever is pivotally mounted upon the depending ears 68 of the plug 39 and is connected to the cable 69 which leads to a point where it may be readily operated by the pilot. 70 is a coil spring located inside the annular flange 60 of the valve and abutting at its upper end the head 63 and at its lower end the split ring 71 which is secured in the annular flange 60. 72 is another coil spring located concentrically in the coil spring 70 and encircling the enlarged stem portion 64 and abutting at its upper end the head 63 and at its lower end the head 45 of the body 41.

When the parts are in their normal or off positions the distance between the annular shoulder formed at the lower end of the enlarged stem portion 64 and the head 45 of the body 41 is greater than the distance between the lower end of the annular flange 60 of the valve 43 and the head 45 of the body 41. Also this latter distance is greater than the total possible contraction of the coil spring 70 to bring its convolutions into contact and make it solid, in effect. Furthermore, the difference between the first two distances is less than the total possible contraction of the coil spring. In the present instance, these distances are $\tfrac{5}{32}''$, $\tfrac{1}{8}''$ and $\tfrac{3}{32}''$, respectively. In other words, the construction is such that the coil spring 70 is movable between predetermined limits from its expanded to its contracted positions and the valve 43 is movable between predetermined limits from a position closing the axial opening or passageway 52 to a position closing the axial openings or passageways 46 and through a distance greater than the spring movement.

Also the operating member or rod 62 is movable between predetermined limits from a position with its head 63 abutting the valve and the latter closing the axial opening or passageway 52 to a position with its enlarged stem portion 64 abutting the head 45 of the body 41 and through a distance greater than the valve movement with a difference less than the spring movement.

When the parts are in their normal or off positions, as shown in Figure 2, the piston 7 of the main fluid pressure producing mechanism 1 is held in its raised position by the coil spring 30 and intermediate parts and the cylinder 4 below the piston 7 is in communication with the reservoir 5. The valve 43 of the control mechanism 3 is also held in its raised position by the coil spring 72 and the conical projection 61 of the valve closes the axial opening or passageway 52 and holds the auxiliary fluid pressure producing mechanism 2 inoperative. At this time the outlet 38 is in communication with the outlet 11 through the intermediate passage so that the wheel cylinders may be readily operated by the main fluid pressure producing mechanism 1 with the minimum travel of its piston to apply the brakes.

If it is desired to use the auxiliary fluid pressure producing mechanism 2 to yieldably hold the brakes applied, as when parking the airplane, the pilot preferably first moves the lever 67 through the cable 69 to pull the operating member or rod 62 downwardly until the annular shoulder at the lower end of the enlarged stem portion 64 engages the head 45 of the body 41, thereby compressing the coil spring 72 and moving the valve 43 downwardly through the coil spring 70. The valve is moved downwardly to engage the lower end of its annular flange 60 with the head 45 and the sealing ring 48 and the conical projection 61 of the valve is moved downwardly therewith away from the head 49 and opens the axial opening or passageway 52. Also the coil spring 70 is compelled to contract in length a distance equal to the difference in downward movement of the rod 62 and the valve 43. If the pilot now pulls downwardly on the piston rod 8 to lower the piston 7 fluid is forced under pressure from the main fluid pressure producing mechanism 1 through the outlet 11, the axial openings or passageways 46 and against the lower face of the valve 43. When the pressure becomes sufficient to overcome the coil spring 70 the valve 43 is raised to an extent not greater than that allowed by the coil spring 70, which is insufficient to close the axial opening or passageway 52 to the auxiliary fluid pressure producing mechanism 2. As a result, fluid under pressure is forced by the main fluid pressure producing mechanism 1 through the outlet 38 to the wheel cylinders and also into the auxiliary fluid pressure producing mechanism 2, the pressure drop being very small and practically negligible because the coil spring 70 is relatively weak and the effective valve pressure area is relatively large. In the present instance the pressure drop amounts to substantially ten pounds per square inch. When sufficient pressure has been created to effectively apply the brakes and also to compress the coil spring 36 of the auxiliary fluid pressure producing mechanism, the pilot first permits the piston 7 of the main fluid pressure producing mechanism 1 to be raised to its normal or off position by the coil spring 30. Then the pilot releases the cable 69 since the pressure exerted by the auxiliary fluid pressure producing mechanism 2 is greater than the effort exerted by the coil spring 72 and holds the valve 43 against the head 45 and the sealing ring 48. At this time the auxiliary fluid pressure producing mechanism is in communication with the valve chamber and its outlet to the wheel cylinders and the communication between the main fluid pressure producing mechanism and the valve chamber is broken.

The construction is such that it is also possible to make the auxiliary fluid pressure producing mechanism 2 operative by first applying pressure on the fluid by pulling downwardly on the piston rod 8 and the piston 7 and by then pulling downwardly on the rod 62 to move the valve 43 to a position placing the auxiliary fluid pressure producing mechanism in communication with the outlet 38. With this sequence of steps, the fluid pressure created by the main fluid pressure producing mechanism tends to hold the valve 43 with its conical projection 61 in a position closing the axial opening or passageway 52. However, the valve can be positively opened to place the auxiliary fluid pressure producing mechanism 2 in communication with the outlet 38 by reason of the coil spring 70 becoming fully contracted and, in effect, solid before the shoulder at the end of the enlarged stem portion 64 engages the head 45 of the body 41. As a result, the downward pull on the rod 62 can be non-yieldably transmitted to the valve 43 to positively move the same downwardly.

It will be apparent that the parts may be permitted to return to their normal or off positions by the pilot pulling downwardly on the rod 8 and the piston 7 of the main fluid pressure producing mechanism 1 to create a pressure which, when added to that exerted by the coil spring 72, is sufficient to raise the valve 43 to initially close the axial opening or passageway 52. Then the piston rod 8 and the piston 7 are allowed to be returned to their normal or off positions, during which time fluid will flow from the wheel cylinders back to the main fluid pressure producing mechanism. Whenever the hydraulic pressure created in the auxiliary fluid pressure producing mechanism 2 by the coil spring 36 is greater than the opposed force exerted by the coil spring 72 through the conical projection 61, fluid will flow from the auxiliary fluid pressure producing mechanism back to the main fluid pressure producing mechanism. It is apparent that excess fluid returning to the main fluid pressure producing mechanism will return to the reservoir.

In the modification illustrated in Figure 6, the same general arrangement of parts is present, with the exception that the valve 73 is directly and positively connected to the manually operable rod 74 for pulling the valve downwardly against the head 75 of the body 76 and also against the sealing ring 77 to prevent flow of fluid under pressure from the wheel cylinders through the outlet 78 and from the auxiliary fluid pressure producing mechanism 79 to the main fluid pressure producing mechanism. The valve 73 is normally held in a position maintaining the auxiliary fluid pressure producing mechanism inoperative by the coil spring 80. It will be noted that with the construction of Figure 6 it is necessary to first pull downwardly on the piston of the main fluid pressure producing mechanism to create the necessary pressure, to fully apply the brakes and to then pull downwardly on the rod 74, while continuing the downward pull on the piston. While the valve 73 is being moved downwardly extra fluid is being forced from the main fluid pressure producing mechanism to the auxiliary fluid pressure producing mechanism so that when the valve has been moved downwardly to its final position the auxiliary fluid pressure producing mechanism is operative to hold the brakes applied. It will be noted that if the piston were pulled downwardly after the valve has been pulled downwardly the pressure transmitted to the outlet 78 and the auxiliary fluid pressure producing mechanism 79 would be dependent upon the force exerted in pulling the valve downwardly. In fact, if the force exerted in pulling the valve downwardly were sufficient, no pressure could be transmitted to the outlet and the auxiliary fluid pressure producing mechanism.

What I claim as my invention is:

1. A fluid pressure control device comprising a fluid pressure producing mechanism, a passage communicating with said mechanism, a mechanism for applying pressure to the fluid in said passage, a valve for normally closing the communication between said second mentioned mechanism and said passage and means for moving said valve comprising an operating member and a spring between said valve and operating member, said spring being movable between predetermined limits, said valve being movable between predetermined limits through a distance greater than said spring movement and said operating member being movable between predetermined limits through a distance greater than said valve movement with a difference less than said spring movement.

2. A fluid pressure control device comprising a fluid pressure producing mechanism, a fluid pressure applying mechanism, a chamber, passageways for placing said chamber in communication with said mechanisms, said passageways having spaced openings into said chamber, an outlet for said chamber between said openings, a valve for normally closing the passageway to said second mentioned mechanism and normally opening the passageway to said first mentioned mechanism, and means for manually moving said valve to a position opening said passageway to said second mentioned mechanism and closing said passageway to said first mentioned mechanism, said means comprising an operating member and a spring operatively connected to said valve and operating member and positioned for actuation by said operating member to move said valve to said position.

3. A fluid pressure control device comprising a cylinder, a piston slidable within said cylinder, a passage communicating with said cylinder, means including a resilient member for applying pressure to the fluid in said passage, a valve for normally closing the communication between said pressure applying means and said passage, an operating member, and means including a resilient member operatively connecting said valve and operating member and operable to positively move said valve to a position opening the communication between said pressure applying means and said passage and also operable to resiliently close the communication between said cylinder and said passage.

4. A fluid pressure control device comprising a cylinder provided with an outlet, a piston slidable within said cylinder, a second cylinder integral with said first mentioned cylinder, a spring-pressed piston slidable within said second cylinder, a third cylinder integral with said first mentioned cylinder, said third cylinder communicating with said outlet of said first mentioned cylinder and having an outlet spaced from said first mentioned outlet, means within said third cylinder forming a chamber communicating with said outlets and second cylinder, a single valve within said chamber for closing the communication between said first mentioned outlet and chamber and the communication between said second cylinder and chamber, said valve being movable between predetermined limits, an operating member movable between predetermined limits through a distance greater than said valve movement, and a spring between said operating member and valve movable between predetermined limits through a distance less than said valve movement and greater than the distance in movements of said valve and operating member.

5. A fluid pressure control device comprising a cylinder provided with an outlet, a piston slidable within said cylinder, a second cylinder integral with said first mentioned cylinder, a spring-pressed piston slidable within said second cylinder, a third cylinder integral with said first mentioned cylinder, said third cylinder communicating with said outlet of said first mentioned cylinder and having an outlet spaced from said first mentioned outlet, means within said third cylinder forming a chamber communicating with said outlets and second cylinder, a single valve within said chamber having a portion for closing the communication between said first mentioned outlet and chamber and having a second portion of less area than said first mentioned portion for closing the communication between said second cylinder and chamber, said valve being movable between predetermined limits, a spring for normally holding said valve in a position closing the communication between said second cylinder and chamber, an operating member movable between predetermined limits through a distance greater than said valve movement, and a second spring between said operating member and valve movable between predetermined limits through a distance less than said valve movement and greater than the difference in movements of said valve and operating member.

6. A fluid pressure control device comprising a chamber having an outlet, mechanism for producing fluid pressure in said chamber and outlet, auxiliary mechanism dependent upon said first mentioned mechanism for applying fluid pressure in said chamber and outlet, a valve within said chamber, spring means for normally holding said valve in a position closing the communication between one of said mechanisms and said chamber, and manually operable means for moving said valve to a position opening the communication between said last mentioned mechanism and chamber, said manually operable means comprising an operating member and a compression spring abutting said valve and operating member and positioned for actuation by said operating member to move said valve to said position.

7. In a device of the character described, the combination of: a power chamber having an outlet passage communicating therewith through a pressure port; piston means in said power chamber adapted to be moved axially therein to force fluid from one end of said power chamber through said pressure port and said outlet passage; an accumulator chamber in fluid communication with said outlet passage through an accumulator port; pressure accumulator means in said accumulator chamber tending to force fluid from one end of said accumulator chamber through said accumulator port and said outlet passage; threeway valve means between said outlet passage and each of said ports, including a first valve seat in said pressure port and a second valve seat in said accumulator port and a valve member movable from a first position in which it is seated on said first valve seat to close said pressure port to a second position in which it is seated on said second valve seat to close said accumulator port, said valve member when in said first position being exposed to fluid pressure in said power chamber tending to move it from said first position toward said second position, said valve member when in said second position having an area exposed to fluid pressure substantially lower than that in said power chamber so as to impress a pressure differential across said valve member tending to retain it in said second position; means for moving said valve member from said second position in a direction countercurrent to fluid flow from said power chamber to said first position; and means providing fluid communication between the other end of said power chamber and the other end of said accumulator chamber.

LUDWIG A. MAJNERI.

REFERENCES CITED

The following references are of record in the file of this patent:

UNITED STATES PATENTS

| Number | Name | Date |
| --- | --- | --- |
| 2,148,268 | Kerr | Feb. 21, 1939 |
| 2,301,037 | Greene | Nov. 3, 1942 |
| 2,322,062 | Schnell | June 15, 1943 |
| 2,343,809 | Schnell | Mar. 7, 1944 |